United States Patent
Liu et al.

(10) Patent No.: US 7,774,560 B2
(45) Date of Patent: Aug. 10, 2010

(54) STORAGE EMULATOR AND METHOD THEREOF

(75) Inventors: Chien-hsing Liu, Shijr (TW); Chih-Hua Lin, Shijr (TW); Shih-Neng Lin, Shijr (TW)

(73) Assignee: ATEN International Co., Ltd., Taipei (TW)

( * ) Notice: Subject to any disclaimer, the term of this patent is extended or adjusted under 35 U.S.C. 154(b) by 427 days.

(21) Appl. No.: 11/948,652

(22) Filed: Nov. 30, 2007

(65) Prior Publication Data
US 2009/0144487 A1    Jun. 4, 2009

(51) Int. Cl.
*G06F 12/00* (2006.01)
(52) U.S. Cl. .................. 711/154; 711/111; 711/203; 703/23; 717/134; 717/138; 718/102
(58) Field of Classification Search ............. 711/111, 711/154, 203; 703/23; 717/134, 138; 718/102
See application file for complete search history.

(56) References Cited

U.S. PATENT DOCUMENTS

| | | | |
|---|---|---|---|
| 5,438,674 A * | 8/1995 | Keele et al. ............... 711/4 |
| 5,812,512 A * | 9/1998 | Tobita et al. .............. 369/84 |
| 6,411,571 B1 * | 6/2002 | Mitsunari et al. ......... 369/30.31 |
| 6,505,281 B1 * | 1/2003 | Sherry ..................... 711/168 |
| 7,120,705 B2 * | 10/2006 | Arai et al. ................. 710/5 |
| 7,200,546 B1 * | 4/2007 | Nourmohamadian et al. . 703/24 |
| 7,359,848 B1 * | 4/2008 | Nourmohamadian et al. . 703/24 |
| 7,370,156 B1 * | 5/2008 | Nguyen et al. ............ 711/147 |
| 7,461,201 B2 * | 12/2008 | Amano et al. ............. 711/111 |
| 7,523,253 B2 * | 4/2009 | Mizuno .................... 711/111 |
| 2003/0225830 A1 * | 12/2003 | Kataoka et al. ........... 709/203 |
| 2009/0119452 A1 * | 5/2009 | Bianchi ................... 711/111 |

* cited by examiner

*Primary Examiner*—Stephen C Elmore
(74) *Attorney, Agent, or Firm*—Patterson & Sheridan, LLP; Keith P. Taboada (57) ABSTRACT

A storage emulator and method thereof are disclosed. The storage emulator allows a host system to access a storage unit connected to a storage system as if the storage unit is directly coupled to the host system. The storage emulator includes a virtual storage emulating module, a storage-managing unit, and a communicating module. The virtual storage emulating module emulates at least one virtual storage unit corresponding to the storage unit on the host system and receives a storage accessing command from the host system. The storage-managing unit identifies the storage accessing command as either a self-sustaining type command or a non-self-sustaining type command. The communicating module communicates with the storage unit of the storage system via the network. If the storage accessing generates a self-sustaining command response in accordance with the storage accessing command and returns the self-sustaining command response to the host system directly. If the storage accessing command is identified as the non-self-sustaining type command, the storage-managing unit forwards the storage accessing command to the storage system via the network, receives a command response in accordance with the storage accessing command from the storage system, and returns the command response to the host system.

20 Claims, 7 Drawing Sheets

STORAGE EMULATOR AND METHOD THEREOF

FIELD OF THE INVENTION

The present invention relates to an emulator device and method thereof, and more particularly to a network storage emulator and method thereof.

BACKGROUND OF THE INVENTION

Figure 1:
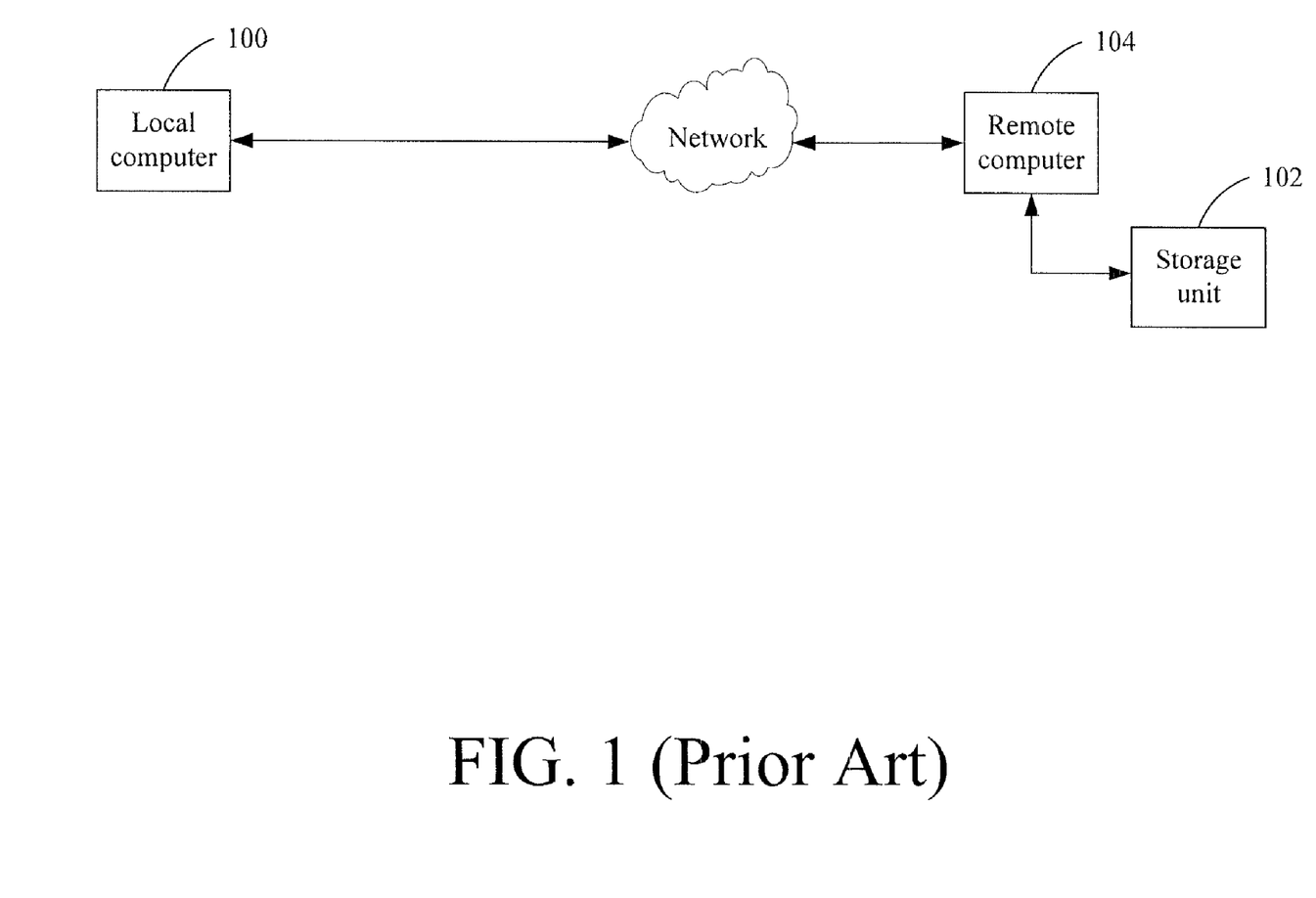
FIG. 1 is a conventional system diagram depicting a local computer for accessing a storage unit connected to the remote computer via a network.

FIG. 1 is a conventional system diagram depicting a local computer (host system) 100 for accessing a storage unit 102 connected to the remote computer (storage system) 104 via a network. The system of accessing the storage unit 102 includes the local remote computer 104. The local computer 100 remotely reads/writes the data stored in the storage unit 102 of the computer 104 by employing a network interface card (not shown) installed thereon.

While the local computer 100 accesses the data within the storage unit 102, the accessed data must be temporarily saved in remote computer, and then transmitted to the local computer 100 via the network. Consequently, time-out of a command might be a problem because the storage unit 102 is indirectly connected to the local computer 100 via the network, and the remote computer 104 may not timely responds to the local computer 100.

SUMMARY OF THE INVENTION

One object of the present invention is to provide a storage emulator for allowing a host system to access a storage unit via a network as if the storage unit is directly coupled to the host system such that the host system is capable of accessing the storage unit on the host system.

Another object of the present invention is to provide a storage emulator for reducing the time-out problem while the host system accesses the storage system. The storage emulator includes a virtual storage emulating module, a storage-managing unit, and a communicating module.

The virtual storage emulating module emulates at least one virtual storage unit corresponding to the storage unit on the host system and receives a storage accessing command from the host system. The storage-managing unit identifies the storage accessing command as either a self-sustaining type command or a non-self-sustaining type command. For example, the self-sustaining type command is selected at least from a group consisting of an inquiry command, a mode sense command, a request sense command and combinations thereof. The non-self-sustaining type command is selected at least from a group consisting of a read command, a write command, a format command and combinations thereof. The communicating module communicates with the storage unit of the storage system via the network.

The storage-managing unit further includes an analyzing unit, a first command executer, a second command sender, a buffer, a state module, and a type manager. The analyzing unit analyzes the storage accessing command for identifying the storage accessing command as either the self-sustaining type command or the non-self-sustaining type command. The first command executer executes the self-sustaining type command and generates the self-sustaining command response accordingly. The second command sender sends the non-self-sustaining type command to the communicating module and triggers the communicating module to send the non-self-sustaining type command to the storage system. The buffer stores the storage accessing command, the command response and the self-sustaining command response. The non-self-sustaining type command of the storage accessing command is sent to the communicating module via the data out path, the command response is received from communicating module via data in path, and the self-sustaining command response is returned to the virtual storage emulating module.

Thus, the storage-managing unit selectively transmits the non-self-sustaining type command and retains the self-sustaining type command for execution in order to save the transmission loading over the network.

The method of performing the storage emulator includes the steps of:

(a) The virtual storage emulating module emulates a virtual storage unit corresponding to the storage unit for the host system.

(b) The virtual storage emulating module receives a storage accessing command from the host system.

(c) The storage-managing unit identifies the storage accessing command as either a self-sustaining type command or a non-self-sustaining type command.

(d) The storage-managing unit generates a self-sustaining command response in accordance with the storage accessing command and returns the self-sustaining command response to the host system directly if the storage accessing command is identified as the self-sustaining type command.

(e) If the storage accessing command is identified as the non-self-sustaining type command, the storage-managing unit forwards the storage accessing command to the storage system via the network, receives a command response in accordance with the storage accessing command from the storage system, and returns the command response to the host system.

According to the above-mentioned description, the storage emulator can identify the storage accessing command to determine whether the storage accessing command is transmitted to the storage system. Therefore, the flow rate between the host system and storage system is effectively reduced, thereby reducing the time-out problem.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 2:
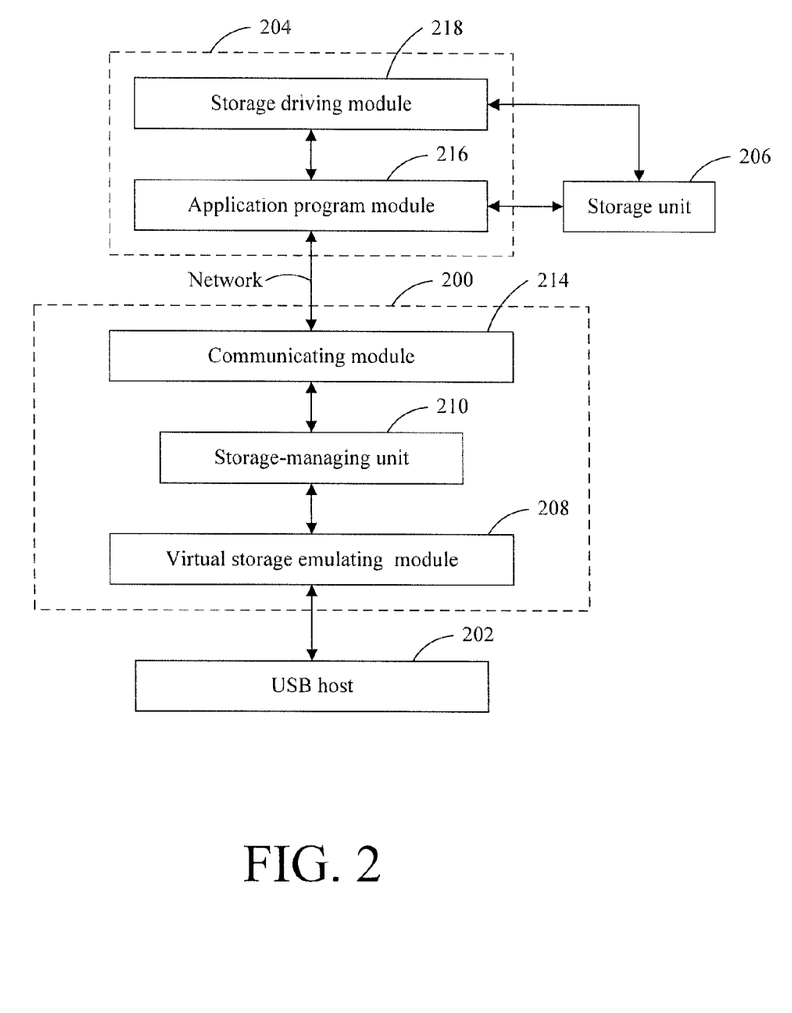
FIG. 2 is a schematic diagram depicting a storage emulator for accessing a storage unit connected to a storage system via a network according to one embodiment of the present invention.

FIG. 2 is a schematic diagram depicting a storage emulator 200 for accessing a storage unit 206 connected to a storage system 204 via a network according to one embodiment of the present invention. The storage emulator 200 is capable of coupling one host system 202, e.g. universal serial bus (USB) host, to the storage system 204, including the storage unit 206, via the network. The storage emulator 200 includes a virtual storage emulating module 208, a storage-managing unit 210, and a communicating module 214. The storage emulator 200 allows a host system 202 to access the storage unit 206 of the storage system 204 via the network. For example, the host system 202 reads or writes the data stored in the storage unit 206 of the storage system 204 by employing the storage emulator 200 while the host system 202 transmits connected to the storage unit 206 directly. Please note that the storage emulator 200 in this embodiment may also be implemented inside other systems, such as a KVM switch system.

The virtual storage emulating module 208 of the storage emulator 200 is coupled to the host system 202. The storage-managing unit 210 couples the virtual storage emulating module 208 to the communicating module 214. The communicating module 214 is coupled to the storage system 204 via the network, such as the local area network (LAN), wide area network (WAN), Intranet or Internet. The storage system 204 further includes an application program (AP) module 216 and a storage driving module 218. The AP module 216 and the storage driving module 218 are coupled to the storage unit 206, respectively, and the AP module 216 is coupled to the storage driving module 218. The AP module 216 couples the storage unit 206 to the communicating module 214 of the storage emulator 200 via the network. Preferably, the storage unit 206 is a floppy disk drive (FDD), a hard disk drive (HDD), a compact disk read only memory (CD-ROM), a flash disk drive, a disk-image file serving as a format of CD-ROM, a digital versatile disk ROM (DVD-ROM) standards, a physical storage unit or logical storage unit.

The virtual storage emulating module 208 emulates at least one virtual storage unit corresponding to the storage unit 206, and receives a storage accessing command from the host system 202. In one embodiment, the storage accessing command is compatible with small computer system interface (SCSI). The storage-managing unit 210 identifies the storage accessing command as either a self-sustaining type command or a non-self-sustaining type command. The self-sustaining type command is generally a command that the storage emulator 200 is capable of processing directly the storage emulator 200 is not capable of processing directly, but needs to forward such command to the storage system 204 for further processing. Storage emulators 200 with different capabilities may have different definitions of self-sustaining command and non-self-sustaining command. For example, the self-sustaining type command may be selected at least from a group consisting of an inquiry command, a mode sense command, a request sense command and combinations thereof. The non-self-sustaining type command may be selected at least from a group consisting of a read command, a write command, a format command and combinations thereof. The communicating module 214 communicates with the storage unit 206 of the storage system 204 via the network.

On one hand, if the storage accessing command is identified as the self-sustaining type command, the storage-managing unit 210 generates a self-sustaining command response in accordance with the storage accessing command and returns the self-sustaining command response to the host system 202 directly. That is, the storage-managing unit 210 is capable of executing the self-sustaining type command and response to the host system 202 directly.

On the other hand, if the storage accessing command is identified as the non-self-sustaining type command, the storage-managing unit 210 forwards the storage accessing command to the storage system 204 via the network. Further, the storage-managing unit 210 receives a command response in accordance with the storage accessing command from the storage system 204, and returns the command response to the host system 202. That is, the storage system 204 executes the non-self-sustaining type command and the storage-managing unit 210 receives and sends the response from the storage system 204 to the host system 202.

Figure 3:
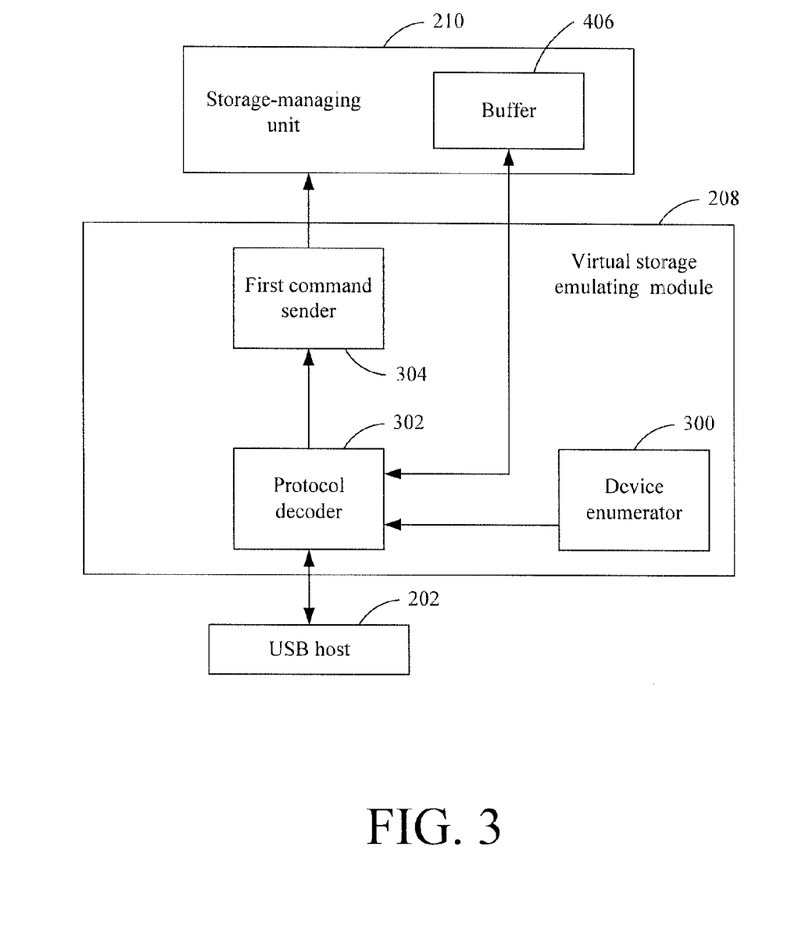
FIG. 3 is a schematic diagram depicting the virtual storage emulating module shown in FIG. 2 according to one embodiment of the present invention.

Please refer to FIG. 2 and FIG. 3. FIG. 3 depicts the virtual storage emsulating module 208 shown in FIG. 2 according to one embodiment of the present invention. The virtual storage emulating module 208 includes a device enumerator 300, a protocol decoder 302, and a first command sender 304. The device enumerator 300 is coupled to the protocol decoder 302. The protocol decoder 302 couples to the host system 202 via an interface protocol, e.g. USB protocol or wireless protocol. The first command sender 304 couples the protocol decoder 302 to the storage-managing unit 210.

The device enumerator 300 enumerates the at least one virtual storage unit corresponding to the storage unit 206 based on the interface protocol. For an example of USB protocol, the device enumerator 300 enumerates the device information associated with the storage unit 206 to generate the virtual storage unit based on USB protocol. The protocol decoder 302 decodes the storage accessing command from the host system 202 based on the USB protocol. The first command sender 304 sends the decoded storage accessing command to the storage-managing unit 210. In one preferred embodiment, the protocol decoder 302 sequentially decodes each of the storage accessing commands while a plurality of storage accessing commands are issued from the host system 202 to the virtual storage emulating module 208. The first command sender 304 then sequentially sends the decoded storage accessing commands to the storage-managing unit 210.

Specifically, before the host system 202 sends the storage accessing command to storage system 204, the device enumerator 300 emulates the storage unit 206 so that the host system 202 is capable of accessing the storage unit 206 as if the storage unit 206 is directly connected to the host system 202. The necessary device information for emulating the storage unit 206 is generated by the storage system 204. The storage unit 206 is emulated at the storage emulator 200 according to the provided information from the storage system 204 periodically so that the host system 202 is capable of acquiring the updated information content in the storage emulator 200. The storage system 204 exports the device information, e.g. storage capacities and/or storage amounts, of the storage unit to the virtual storage emulating module 208 of the storage emulator 200, and the host system 202 finds the exported device information and regards the storage unit 206 as an accessible local device. Preferably, the device enumerator 300 emulates the device information of the storage unit 206 to allow the host system 202 to make a connection to the storage unit 206 based on the device interface protocol before the host system 202 starts to issue the storage accessing command.

Figure 4:
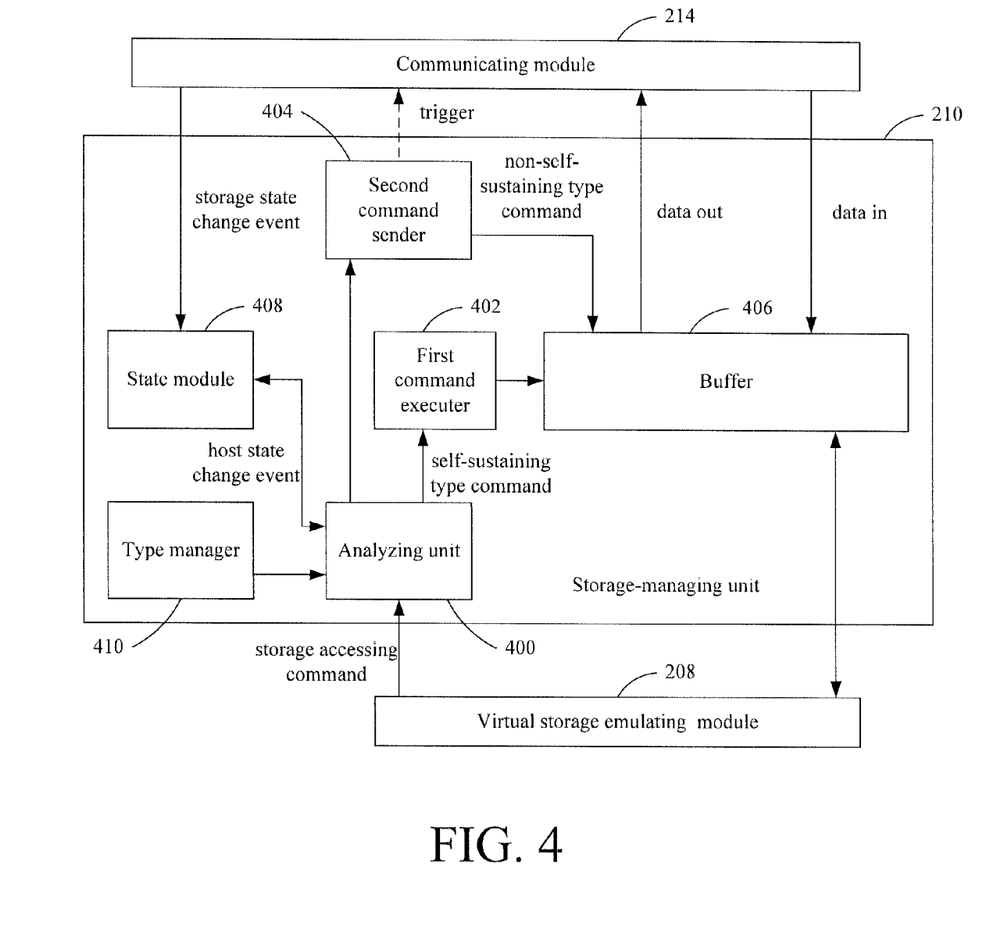
FIG. 4 is a schematic diagram depicting the storage-managing unit shown in FIG. 2 according to one embodiment of the present invention.

Please refer to FIG. 2, FIG. 3 and FIG. 4. FIG. 4 depicts the storage-managing unit 210 shown in FIG. 2 according to one embodiment of the present invention. The storage-managing unit 210 includes an analyzing unit 400, a first command executer 402, a second command sender 404, a buffer 406, a state module 408, and a type manager 410. The analyzing unit 400 is coupled to the first command sender 304 of the virtual storage emulating module 208. The first command executer 402 couples the analyzing unit 400 to the buffer 406. The second command sender 404 couples the analyzing unit 400 to the buffer 406. The state module 408 couples the communicating module 214 to the analyzing unit 400 and the type manager 410 is coupled to the analyzing unit 400.

The analyzing unit 400 analyzes the storage accessing command for identifying the storage accessing command as either the self-sustaining type command or the non-self-sustaining type command. The first command executer 402 executes the self-sustaining type command and generates the self-sustaining command response command of the storage accessing command within the storage-managing unit 210 and stores the self-sustaining command response to the buffer 406. The second command sender 404 sends the non-self-sustaining type command to the communicating module 214 and triggers the communicating module 214 to send the non-self-sustaining type command to the storage system 204. The buffer 406 stores the storage accessing command, the command response and the self-sustaining command response. The non-self-sustaining type command of the storage accessing command is sent to the communicating module 214 via the data out path, the command response is received from communicating module 214 via data in path, and the self-sustaining command response is returned to the virtual storage emulating module 208 shown in FIG. 2.

Thus, the storage-managing unit 210 selectively transmits the non-self-sustaining type command and retains the self-sustaining type command for local execution in order to save the transmission loading over the network, thereby reducing the time-out problem of the storage system 204.

The state module 408 monitors a storage state change event of the storage unit 206 and records a storage state of the storage unit 206. The state module 408 further monitors and records a state of the host system 202. The storage system 204 preferably updates the state module 408 of the storage emulator 200 with the device information of the storage unit 206. In one embodiment, the analyzing unit 400 checks the state module 408 to determine whether the storage unit 206 is ready. For example, after a boot disk is inserted into the storage unit 206, say, a CD-ROM drive, the ready state of the boot disk is recorded in the state module 408 so that the analyzing unit 400 locally utilizes the state module 408 to enable the host system 202 to be booted from the boot disk. Conversely, if the boot disk is not ready, the unready state is also recorded in the state module 408 and the analyzing unit 400 locally notifies the host system 202 of the unready state. In one preferred embodiment, the analyzing unit 400 continuously checks the state module 408 until the ready state is recorded in the state module 408 for booting the host system 202 from the boot disk.

The type manager 410 records a plurality of device types and checks a plurality of command types. The analyzing unit 400 identifies a device type of the storage unit 206 according to the device types and determines a command type to be executed accordingly. That is, the analyzing unit 400 determines whether the storage accessing command from the host system 202 is identical to one of the command types of the storage unit 206. For example, the storage unit 206 is a disk drive having SCSI block commands, while the host system 202 sends a multi-media command for DVD to the storage system 204 via the storage emulator 200. Thus, the analyzing unit 400 compares the device type of disk drive with the device type of DVD, and determines that the disk drive of the storage unit 206 supports the multi-media command from the host system 202. If the multi-media command is not compatible with the command type of the storage unit 206, the storage system 204 cannot execute the multi-media command for disk drive. To solve the problem, the storage-managing unit 210 notifies the host system 202 of resending a new command which is compatible with the command type stored in the type manager 410.

Figure 5:
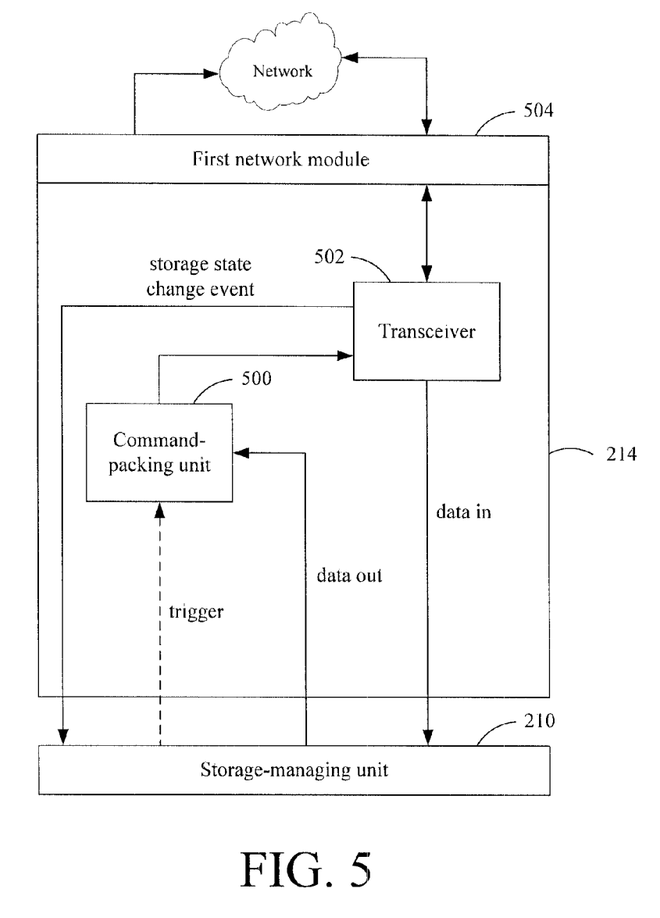
FIG. 5 is a schematic diagram depicting the communicating module shown in FIG. 2 according to one embodiment of the present invention.

Please refer to FIG. 2, FIG. 4, and FIG. 5. FIG. 5 depicts the communicating module 214 shown in FIG. 2 according to one embodiment of the present invention. The communicating module 214 includes a command-packing unit 500 and a transceiver 502. The command-packing unit 500 couples the second command sender 404 of the storage-managing unit 210 to the transceiver 502. The transceiver 502 couples to the AP module 216 via the first network module 504 and further couples to the buffer 406 and the state module 408 of the storage-managing unit 210, respectively.

The command-packing unit 500 packs the non-self-sustaining type command from the buffer 406 via the data out path while receiving a trigger event from the second command sender 404. Then, the command-packing unit 500 issues the packed non-self-sustaining type command to the transceiver 502. Preferably, the command-packing unit 500 packs the command into the packet-based command and transmits the packet-based command to the storage system 204. The transceiver 502 sends the packed non-self-sustaining type command to the storage system 204 and receives the command response from the storage unit 206 by way of the first network module 504 and the network. The transceiver 502 then sends the received command response to the buffer 406 via the data in path, and further transmits the storage state change event associated with the storage unit 206 to the state module 408 shown in FIG. 4.

Figure 6:
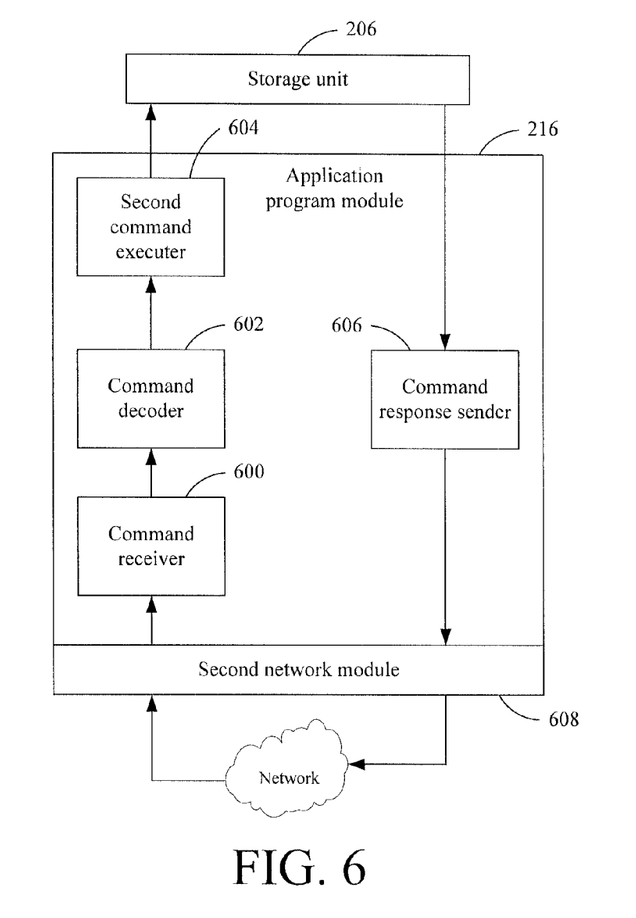
FIG. 6 is a schematic diagram depicting the AP module shown in FIG. 2 according to one embodiment of the present invention.

Please refer to FIG. 2, FIG. 5 and FIG. 6. FIG. 6 depicts the AP module 216 shown in FIG. 2 according to one embodiment of the present invention. The storage system 204 further includes an application program module 216 for communicating with the communicating module 214 via the network. The command receiver 600 couples to the first network module 504 of the communicating module 214 via the second network module 608. The command decoder 602 is coupled between the command receiver 600 and the second command executer 604. The second command executer 604 is coupled to the storage driving module 218 and the storage unit 206, respectively. The command response sender 606 couples the second network module 608 to the first network module 504 of the communicating module 214.

The application program module 216 includes a command receiver 600, a command decoder 602, a second command executer 604, and a command response command from the transceiver 502. The command decoder 602 decodes the packed non-self-sustaining type command into an executable command. The second command executer 604 executes the executable command for accessing the storage unit 206. The command response sender 606 sends the command response of the executable command to the transceiver 502 of the communicating module 214.

In one embodiment, if the AP module 216 is only utilized in some specific kinds of the storage units 206, the storage driving module 218 can further support a variety of the storage units 206. That is, the storage driving module 218 can decode the packed non-self-sustaining type command, executes the executable command for accessing the storage unit 206, and generates the command response. Then, the storage driving module 218 intermediately passes the command response to the command response sender 606 of the AP module 216.

Please refer to FIG. 2 again. In the present invention, the non-self-sustaining type command of the storage accessing command can be packed to the command packet including device information packet, control packet, interrupt packet, device status packet, device status request packet, and response result packet. The packets are described in detail as follows:

The device information packet includes the fields of "Packet ID", "Device ID", "Device Info Length", and "Device Info". "Packet ID" indicates packet type. "Device ID" represents the drive number in the storage system. "Device Info Length" represents the length of "Device Info", e.g. 16 bits. "Device Info" is the associated information of the device, including inquiry, capacity, read format capacities, and mode sense. Preferably, the storage system 204 transmits the information of the drive to the storage emulator 200. For example, the storage system 204 transmits the device information is sent to the storage emulator 200 and "Packet ID" is the packet type of "0000-0001" in term of 8 bits. Second, the capacity information is sent to the storage emulator 200 and "Packet ID" is the packet type of "0000-0002" in term of 8 bits.

Third, the read format capacities are sent to the storage emulator 200 and "Packet ID" is the packet type of "0000-0003" in term of 8 bits. Finally, the mode sense is sent to the storage emulator 200 and "Packet ID" is the packet type of "0000-0004" in term of 8 bits.

The control packet includes the fields of "Packet ID", "Device ID", "CDB", "CDB Length", "Data Length", and "Data". The meanings of "Packet ID" and "Device ID" are the same as the above-mentioned description. "CDB" represents the commands having a fixed length, e.g. 16 bytes. "CDB Length" indicates the length of "CDB". "Data" is used to store input/output data. The control packet is used to control the transmission of the command, operation procedures of the command, and executed result of the command between the storage emulator 200 and the storage system 204, i.e. from the storage emulator 200 to the storage system 204 or from the storage system 204 to the storage emulator 200. For example, the control packet of "Format Unit" command is transmitted between the storage emulator 200 and the storage system 204, wherein the format parameter is stored in the "Data" field. The control packet of "Read" command is transmitted from the storage emulator 200 to the storage system 204 wherein the "CDB" field indicates the sector of the desired data, and after the storage emulator 200 identifies the "Read" command from the storage system 204, the control packet of "Read" command is then transmitted from the storage system 204 to the storage emulator 200 wherein an operation code is stored in the "CDB" field.

The interrupt packet includes the fields of "Packet ID", "Device ID", and "UFI sense data". The meanings of "Packet ID" and "Device ID" are the same as the above-mentioned description. The "UFI Sense Data" field means that the information is transmitted from the storage unit 206 to the storage emulator 200 after the storage emulator 200 executes the "Control packet". Preferably, the "interrupt packet" is sent from the storage system 204 to the storage emulator 200.

The device status packet includes the fields of "Packet ID", "Device ID", and "Device Status". The meanings of "Packet ID" and "Device ID" are the same as the above-mentioned description. The "Device Status" indicates the current status of the storage unit 206. The status may be "no sense", "not ready", "hardware error", or "disconnect". Preferably, the "device status packet" is sent from the storage system 204 to the storage emulator 200.

The device status request packet includes the fields of "Packet ID" and "Device ID". The meanings of "Packet ID" and "Device ID" are the same as the above-mentioned description. If the storage emulator 200 needs to detect the status of the storage unit 206, the storage emulator 200 issues the "Device status request packet" to the storage unit 206 and the storage unit 206 returns the "Device status packet" to the storage emulator 200 in response to the status detection. Preferably, the "Device status request packet" is sent from storage emulator 200 to the storage system 204.

The response result packet includes the fields of "Packet ID" and "Response result". The "Packet ID" meaning is the same as the above-mentioned description. "Response result" informs the command execution result from the storage emulator 200 to the storage system 204 or vice versa. For example, if the "Response result" represents "Success", it indicates that the current command is successfully executed, and a next command can be executed. If the "Response result" represents "Fail", it indicates that the storage emulator 200 or the storage system 204 fails to execute the current command.

Preferably, the "interrupt packet" is sent to the storage emulator 200 or the storage system 204 in response to the "control packet". The "response result packet" is sent to the storage emulator 200 or the storage system 204 in response to the "Device information packet", "device status packet", and "device status request packet" to confirm whether the command is executed successfully.

Figure 7:
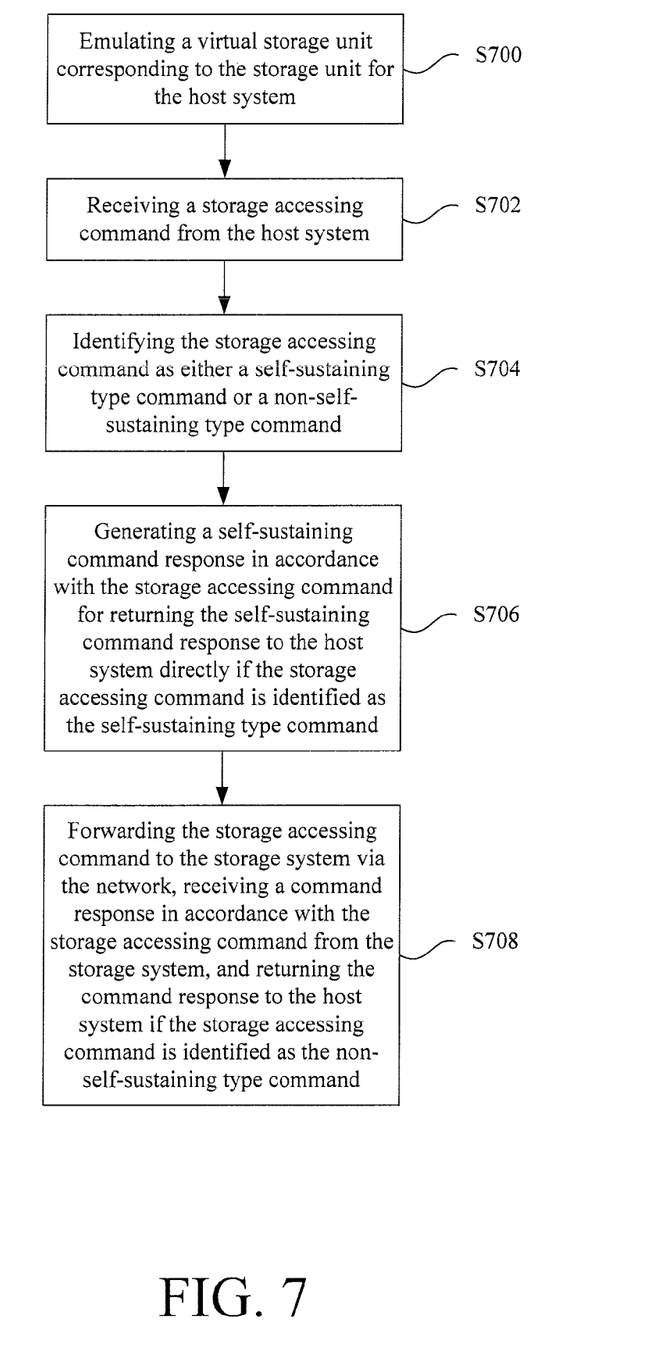
FIG. 7 is a flow chart of performing steps of the storage emulator according to one embodiment of the present invention.

Please refer to FIGS. 2-6 and FIG. 7. FIG. 7 is a flow chart of performing steps of the storage emulator 200 for allowing a host system 202 to access a storage unit 206 connected to a storage system 204 via a network as if the storage unit 206 is directly coupled to the host system 202 according to one embodiment of the present invention. The flow chart includes the steps of:

In step S700, the virtual storage emulating module 208 emulates a virtual storage unit corresponding to the storage unit 206 for the host system 204.

In step S702, the virtual storage emulating module 208 receives a storage accessing command from the host system 204.

In step S704, the storage-managing unit 210 identifies the storage accessing command as either a self-sustaining type command or a non-self-sustaining type command.

In step S706, the storage-managing unit 210 generates a self-sustaining command response in accordance with the storage accessing command and returns the self-sustaining command response to the host system directly if the storage accessing command is identified as the self-sustaining type command.

In step S708, the storage-managing unit 210 forwards the storage accessing command to the storage system 204 via the network, receives a command response in returns the command response to the host system 202 if the storage accessing command is identified as the non-self-sustaining type command.

In one embodiment, the self-sustaining type command is selected at least from a group consisting of an inquiry command, a mode sense command, a request sense command and combinations thereof. The non-self-sustaining type command is selected at least from a group consisting of a read command, a write command, a format command and combinations thereof.

According to the above-mentioned description, the storage emulator 200 can identify and filter the storage accessing command to determine whether the storage accessing command are transmitted to the storage unit of the storage system. Therefore, the traffic between the host system and storage system is effectively reduced, thereby reducing the time-out problem.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A storage emulator for allowing a host system to access a storage unit connected to a storage system via a network as if the storage unit is directly coupled to the host system, the storage emulator comprising:
   a virtual storage emulating module coupled to the host system, for emulating at least one virtual storage unit corresponding to the storage unit on the host system and receiving a storage accessing command from the host system;
   a storage-managing unit, for identifying the storage accessing command as either a self-sustaining type command or a non-self-sustaining type command; and
   a communicating module, for communicating with the storage unit of the storage system via the network;
   wherein if the storage accessing command is identified as the self-sustaining type command, the storage-managing unit generates a self-sustaining command response in accordance with the storage accessing command and returns the self-sustaining command response to the host system directly; if the storage accessing command is identified as the non-self-sustaining type command, the storage-managing unit forwards the storage accessing command to the storage system via the network, receives a command response in accordance with the storage accessing command from the storage system, and returns the command response to the host system.

2. The storage emulator of claim 1, wherein the non-self-sustaining type command is selected at least from a group consisting of a read command, a write command, a format command and combinations thereof.

3. The storage emulator of claim 1, wherein the self-sustaining type command is selected at least from a group consisting of an inquiry command, a mode sense command, a request sense command and combinations thereof.

4. The storage emulator of claim 1, wherein the storage unit is a FDD, a HDD, a CD-ROM, a flash disk drive or a disk-image file.

5. The storage emulator of claim 1, wherein the virtual storage emulating module further comprises:
   a device enumerator, for enumerating the at least one virtual storage unit corresponding to the storage unit based on an interface protocol;
   a protocol decoder, for decoding the storage accessing command from the host system based on the interface protocol; and
   a first command sender, for sending the decoded storage accessing command to the storage-managing unit.

6. The storage emulator of claim 5, wherein the interface protocol is universal serial bus (USB).

7. The storage emulator of claim 1, wherein the storage-managing unit further comprises:
   an analyzing unit, for analyzing the storage accessing command for identifying the storage accessing command as either the self-sustaining type command or the non-self-sustaining type command;
   a first command executer, for executing the self-sustaining type command and generating the self-sustaining command response accordingly; and
   a second command sender, for sending the non-self-sustaining type command to the communicating module and triggering the communicating module to send the non-self-sustaining type command to the storage system.

8. The storage emulator of claim 7, wherein the storage-managing unit further comprises a buffer, for storing the storage accessing command, the command response and the self-sustaining command response.

9. The storage emulator of claim 7, wherein the storage-managing unit further comprises a state module, for monitoring a storage state change event of the storage unit and recording a storage state of the storage unit.

10. The storage emulator of claim 9, wherein the state module further monitors and records a state of the host system.

11. The storage emulator of claim 7, wherein the storage-managing unit further comprises a type manager, for recording a plurality of device types and checking a plurality of command types.

12. The storage emulator of claim 11, wherein the analyzing unit identifies a device type of the storage unit according to the device types, and determines a command type to be executed accordingly.

13. The storage emulator of claim 1, wherein the communicating module further comprises:
   a command-packing unit, for packing the non-self-sustaining type command from the storage-managing unit; and
   a transceiver, for sending the packed non-self-sustaining type command to the storage system via the network and receiving the command response from the storage unit.

14. The storage emulator of claim 13, wherein the storage system further comprises an application program module for communicating with the communicating module via the network.

15. The storage emulator of claim 14, wherein the application program module further comprises:
   a command receiver, for receiving the packed non-self-sustaining type command from the transceiver;
   a command decoder, for decoding the packed non-self-sustaining type command into an executable command; and
   a second command executer, for executing the executable command for accessing the storage unit.

16. The storage emulator of claim 15, wherein the application program module further comprises a command response sender, for sending the command response of the executable command to the transceiver of the communicating module.

17. A method for allowing a host system to access a storage unit connected to a storage system via a network as if the storage unit is directly coupled to the host system, the method comprising the steps of:
   emulating a virtual storage unit corresponding to the storage unit for the host system;
   receiving a storage accessing command from the host system;

identifying the storage accessing command as either a self-sustaining type command or a non-self-sustaining type command;

generating a self-sustaining command response in accordance with the storage accessing command and returning the self-sustaining command response to the host system directly if the storage accessing command is identified as the self-sustaining type command; and forwarding the storage accessing command to the storage system via the network, receiving a command response in accordance with the storage accessing command from the storage system, and returning the command response to the host system if the storage accessing command is identified as the non-self-sustaining type command.

18. The method of claim 17, wherein the non-self-sustaining type command is selected at least from a group consisting of a read command, a write command, a format command and combinations thereof.

19. The method of claim 17, wherein the self-sustaining type command is selected at least from a group consisting of an inquiry command, a mode sense command, a request sense command and combinations thereof.

20. The method of claim 17, wherein the storage unit is a FDD, a HDD, a CD-ROM, a flash disk drive or a disk-image file.

* * * * *